(12) United States Patent
Abdallah

(10) Patent No.: US 11,886,582 B1
(45) Date of Patent: Jan. 30, 2024

(54) MALICIOUS JAVASCRIPT DETECTION BASED ON ABSTRACT SYNTAX TREES (AST) AND DEEP MACHINE LEARNING (DML)

(71) Applicant: Google LLC, Mountain View, CA (US)

(72) Inventor: Ahmed Abdallah, Falls Church, VA (US)

(73) Assignee: GOOGLE LLC, Mountain View, CA (US)

(*) Notice: Subject to any disclaimer, the term of this patent is extended or adjusted under 35 U.S.C. 154(b) by 236 days.

(21) Appl. No.: 17/125,085

(22) Filed: Dec. 17, 2020

Related U.S. Application Data

(60) Provisional application No. 62/955,222, filed on Dec. 30, 2019.

(51) Int. Cl.
| | |
|---|---|
| *H04L 29/06* | (2006.01) |
| *G06F 21/56* | (2013.01) |
| *G06N 3/04* | (2023.01) |
| *G06N 3/08* | (2023.01) |
| *G06F 21/55* | (2013.01) |

(52) U.S. Cl.
CPC ............ *G06F 21/563* (2013.01); *G06F 21/55* (2013.01); *G06F 21/566* (2013.01); *G06N 3/04* (2013.01); *G06N 3/08* (2013.01); *G06F 2221/033* (2013.01)

(58) Field of Classification Search
CPC ...... G06F 21/563; G06F 21/55; G06F 21/566; G06F 2221/033; G06N 3/04; G06N 3/08
See application file for complete search history.

(56) References Cited

U.S. PATENT DOCUMENTS

| | | | | |
|---|---|---|---|---|
| 9,825,976 | B1* | 11/2017 | Gomez | ............... H04L 63/1416 |
| 2017/0212829 | A1* | 7/2017 | Bales | .................. G06F 11/3604 |

OTHER PUBLICATIONS

Mou Lili et al "Convolutional Neural Networks over Tree Structures for Programming Language Processing" Proceedings of the Thirtieth AAAI Conference on Artificial Intelligence, AAAI—Feb. 16, 2016, pp. 1287-1293 (Year: 2016).*

Kipf. T.N. et al. (Sep. 9, 2016). "Semi-Supervised Classification with Graph Convolutional Networks," 5th International Conference on Learning Representations (ICLR-17), pp. 1-14.

* cited by examiner

*Primary Examiner* — Evans Desrosiers
(74) *Attorney, Agent, or Firm* — Dority & Manning, P.A.

(57) ABSTRACT

A method for assessing a cybersecurity risk of a software object includes generating an abstract syntax tree (AST) for a software object, and determining that the AST is insufficient to identify, to a specified confidence level, a cybersecurity risk of the software object. In response to determining that the AST is insufficient to identify the cybersecurity risk of the software object, a graph convolutional neural network (gCNN) is executed, based on the AST, to produce a set of features for the AST and to produce a probability of maliciousness of the software object based on the set of features. A signal representing an alert is sent, based on the probability of maliciousness, if the probability of maliciousness exceeds a pre-defined threshold.

23 Claims, 4 Drawing Sheets

US 11,886,582 B1

MALICIOUS JAVASCRIPT DETECTION BASED ON ABSTRACT SYNTAX TREES (AST) AND DEEP MACHINE LEARNING (DML)

CROSS-REFERENCE TO RELATED APPLICATIONS

This application claims the benefit of U.S. Provisional Patent Application No. 62/955,222, filed Dec. 30, 2019 and titled "Malicious Javascript Detection Based on Abstract Syntax Trees (AST) and Deep Machine Learning (DML)," the entirety of which is incorporated by reference herein in its entirety.

TECHNICAL FIELD

This disclosure relates generally to cybersecurity classification of computer files, and in particular, to the use of deep machine learning to classify interpreted language scripts.

BACKGROUND

Artificial intelligence (AI) is a branch of computer science related to the development of intelligent machines and software that mimic cognitive functions such as learning and problem solving. The use of AI in cybersecurity is growing. Ensuring the continuous improvement of AI in cybersecurity is important to more effectively and efficiently detect and prevent cyberattacks. Machine learning is a class of AI that allows computers to operate in a self-learning mode.

SUMMARY

The presently disclosed subject matter includes a method for assessing a cybersecurity risk of a software object. In some embodiments, the method includes generating an abstract syntax tree (AST) for a software object (e.g., an interpreted language script), and determining that the AST is insufficient to identify, to a specified confidence level, a cybersecurity risk of the software object. In response to determining that the AST is insufficient to identify the cybersecurity risk of the software object, a graph convolutional neural network (gCNN) is executed (e.g., in a single execution step), based on the AST, to (1) produce a set of features for the AST, and (2) produce a probability of maliciousness of the software object based on the set of features. A signal representing an alert is sent, based on the probability of maliciousness, if the probability of maliciousness exceeds a pre-defined threshold.

In some embodiments, a system for assessing a cybersecurity risk of a software object includes a first compute device and a second device. The first compute device includes a processor and a memory operably coupled to the processor of the first compute device. The memory of the first compute device stores processor-executable instructions to generate an AST for a software object (e.g., an interpreted language script), and to determine that the AST is insufficient to identify, to a specified confidence level, a cybersecurity risk of the software object. The memory of the first compute device also stores processor-executable instructions to send a first signal including a representation of the AST, in response to determining that the AST is insufficient to identify the cybersecurity risk of the software object, and to receive a signal representing a probability of maliciousness of the software object. The memory of the first compute device optionally also stores processor-executable instructions to extract the software object from one of a webpage, an email, or one or more network packets, prior to generating the AST. Alternatively or in addition, the memory of the first compute device can store processor-executable instructions to receive a signal representing an alert associated with the software object from the second compute device, and to perform a remediation action in response to receiving the signal representing the alert.

DETAILED DESCRIPTION

Figure 1:
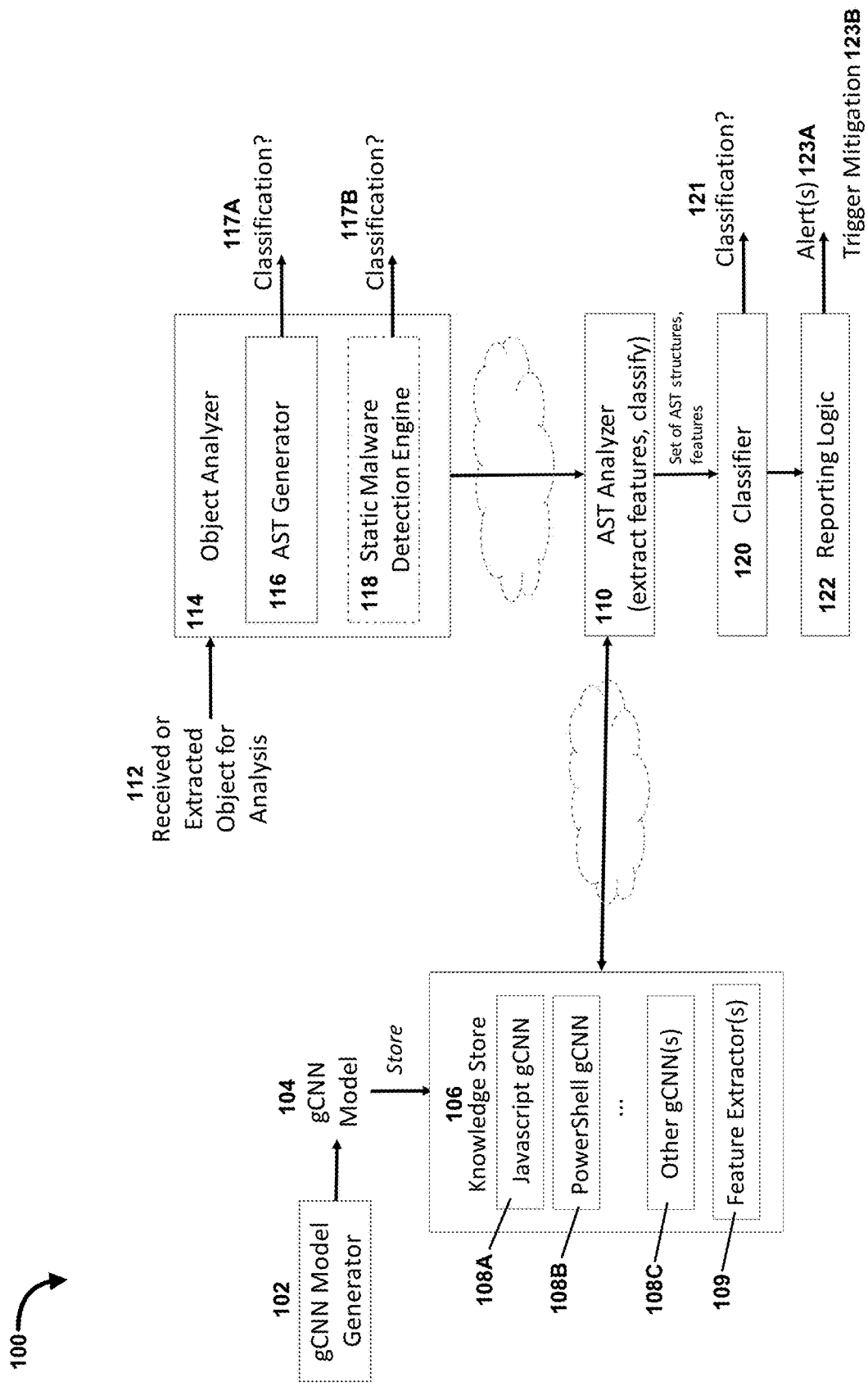
FIG. 1 is a diagram showing a first example system configuration for assessing a cybersecurity risk of a software object, according to an embodiment.

Neural networks can be used for analyzing and classifying certain types of datasets. For example, known convolutional neural networks (CNNs) can be used to analyze and classify (e.g., via labeling) two-dimensional images, and known graph CNNs (gCNNs, or GCNs) can be used to analyze data within social networking applications (e.g., by interpreting relationships within the structure of a social network). Such techniques have not been known, however, to be used for classifying interpreted languages (e.g., scripts such as JavaScript) as malicious, suspicious or benign.

Interpreted languages such as JavaScript are common malware attack vectors. For example, interpreted languages have been used by malicious entities ("attackers") to perform drive-by downloads and email-based attacks, and to add malicious functionality to websites. Some known prior systems have attempted to use abstract syntax trees (ASTs) to classify an object as malicious, suspicious, or benign. Such classification systems, however, have relied on traditional supervised machine learning, rather than deep machine learning, to associate ASTs with "known malicious" ASTs. Such techniques are typically error-prone, however, and can involve the resource-intensive generation of traditional machine learning models. Moreover, scripts in particular (written in scripting languages) can be challenging to analyze and classify because they are relatively sparse, or lacking in structure, as compared for example to image files, and can include obfuscation that is not necessarily malicious. As such, a need exists for improved techniques for detecting malicious interpreted scripts.

Embodiments set forth herein address the foregoing issues with known object classification methods by classifying interpreted language files, e.g., as malicious, suspicious, or benign, using a deep machine learning model associated with an AST of a target object, rather than associated directly with source code of the target object. Systems and methods of the present disclosure facilitate the detection of malicious binaries (i.e., binary files) and software that has been compiled from a program language, in some cases without performing feature extraction. In other words, in some embodiments, a scaleable classification method can be applied to objects written in any of a variety of different languages without the need to perform feature engineering for each individual language and/or without the need to parse the object. Cybersecurity systems set forth herein can include an object analyzer, an AST analyzer, a classifier, a knowledge store, a reporting logic, and a gCNN model generator, for example as shown and described with reference to FIG. 1.

As used herein, an "object" (or software object) refers to content in the form of an item of information having a logical structure or organization that enables it to be classified for purposes of analysis for malware. For example, an object may include a data structure, a function, a method, an instance of a class, a bundle or collection of variables and related methods, or any combination thereof. Objects can be stored as values in memory and referenced by associated identifiers. An "interpreted language" is a type of programming language that, when implemented as a program, executes its instructions freely, without a preceding compilation into machine-language instructions. A scripting language is a programming language that is interpreted at run-time. An abstract syntax tree (AST) is a tree representation of the abstract syntactic structure of source code written in a programming language, where each node of the tree denotes a construct occurring in the source code.

A graph neural network (referred to, for example, as "a graph convolutional network" (gCN) or "a graph convolutional neural network" (gCNN)) is a type of neural network that operates directly on a graph structure. Historically, it has been difficult to infer useful insights from underlying graphs, due to their complex structure (e.g., non-Euclidean characteristics and data). gCNNs can be used to overcome such difficulties by exploiting the stationarity and compositionality properties of certain types of data, including graphical data. For example, a gCNN can leverage the structure of a graph to aggregate information about the nodes of the graph, from within one or more node "neighborhoods" of the graph, e.g., in a convolutional manner. The gCNN can take, as its inputs, matrices of features for each node and a matrix representation of the graph structure. Each layer within the gCNN can include a feature matrix where each row is a feature representation of a node. At each such layer, the features can be aggregated to form a next layer's features, using a propagation rule. As such, features can become increasingly abstract at each consecutive layer. Variants of gCNNs can differ (in some cases only) on the choice of the propagation rule. Additional details about graph neural networks can be found, for example, in "Semi-Supervised Classification with Graph Convolutional Networks," by T. N. Kipf and M. Welling, $5^{th}$ International Conference on Learning Representations (ICLR-17), 2016, the entire contents of which are incorporates by reference herein for all purposes.

FIG. 1 is a diagram showing a first example system configuration for assessing a cybersecurity risk of a software object, according to an embodiment. The system 100 includes a gCNN model generator 102, a knowledge store 106, an AST analyzer 110, an object analyzer 114, a classifier 120 and reporting logic 122. The knowledge store 106 may store a plurality of gCNN models and feature extractors (109). The feature extractors can include feature extractors that are associated with the gCNN models and/or general purpose feature extractors. During operation of the system 100, a gCNN model 104 is generated by the gCNN model generator 102, for example in accordance with a labeling of ASTs associated with prior classified objects (e.g., objects that have been labelled, for example as malicious, suspicious, benign, etc.). One or more gCNN models can be stored in the knowledge store 106. For example, as shown in FIG. 1, a gCNN model associated with JavaScript ASTs (JavaScript gCNN 108A) can be stored in the same knowledge store 106 as a separate gCNN model associated with PowerShell ASTs (PowerShell gCNN 108B). The gCNN model generator 102 can be physically located remote from the classifier 120, and the gCNN model 104 can be provided/sent to the knowledge store 106 (which may be local to or remote from the gCNN model generator 102), for example via an update mechanism. As an example, an update mechanism can be implemented via instructions stored in the knowledge store 106 (or in a memory operably coupled to the knowledge store 106) to send, for example periodically, upon the occurrence of an event, and/or according to a predefined schedule, signals to the gCNN model generator 102 to query the gCNN model generator 102 for new gCNN models (and, in response to the querying and if one or new gCNN models exist at the gCNN model generator 102, receive the requested new gCNN models). As another example, an update mechanism can be implemented via instructions stored in the gCNN model generator 102 (or a compute device associated therewith) to detect the modification of an existing gCNN model or the generation of a new gCNN model and, in response to detecting the modification or generation, sending a signal representing the modified gCNN model or the new gCNN model to the knowledge store 106 or a compute device associated therewith. Delivery of the gCNN model 104 to the knowledge store 106 can occur, for example, periodically or aperiodically (e.g., according to a predetermined and/or configurable schedule, or in response to a request message).

Also during operation of the system 100, the object analyzer 114 receives or extracts an object for analysis 112 (also referred to herein as a "target object"). The object for analysis 112 may be received, for example, as a separate programmatic entity (e.g., via web crawling or web scraping) or extracted from a received webpage, an email, or other network traffic. The object can be a script (or other programmatic entity) in an interpreted language, such as JavaScript. The system 100 generates an AST associated with the received/extracted object, via the AST generator 116. The AST can function as graph "nodes" (having interconnectivity, layers, patterns, etc.) when provided to a gCNN. An AST provides a standard form of the target object that is susceptible to analysis. The generated AST can be used to pre-analyze the received or extracted object and potentially detect a maliciousness of the received/extracted object and/or assign a classification to the received/extracted object, e.g., based on a heuristic or a signature identifiable using previous malware. In some instances, the results of the AST generation may be sufficient to assign a classification 117A (e.g., as malicious or benign) to the object for analysis 112. Alternatively, or in addition, in some instances, a static analysis performed using the static malware detection engine 118 may be sufficient to assign a classification 117B (e.g., as malicious or benign) to the object for analysis 112. The static malware detection engine 118 is responsible for classifying objects based on previously known malicious or benign objects using a signature- and/or heuristics-based system for detection. In some implementations, the attempt to classify the object for analysis 112 based on the AST generation may precede the attempt to classify the object for analysis 112 using the static malware detection engine 118. If the static analysis results are insufficient to classify the received object as malicious or benign, the received object may be further analyzed by the system 100. Accordingly, the static analysis engine 118 may be viewed as a filer to reduce the need for further analysis, via the generated AST of a received object, by the system 100, thereby increasing efficiency (by way of fewer objects being subject to the further analysis).

The AST analyzer 110 can receive the AST of the object for analysis 112 from the object analyzer 114 and analyze it using one or more trained gCNN models (e.g., received/retrieved from the knowledge store 106) to generate/extract features associated with the trained gCNN model(s). The AST can be input, for example, to a linear layer of the gCNN model(s). The AST analyzer 110 can include feature extractors associated with the trained gCNN model(s). The feature extractors, in some embodiments, may be gCNN model-specific and configured for the model, while in other embodiments may include "general purpose" feature extractors in use across a set of models. The feature extractors identify specific features associated with aspects of an object's AST. These features can include, for example, one or more of: an overall code structure, an overall code functionality, a structure of one or more code subsets, and a functionality of one or more code subsets. The AST analyzer 110 generates a classification of the AST of the received object by analyzing features of the AST in accordance with the trained gCNN model and, optionally, using the feature extractors. Although shown and described as operating using gCNN principles, the AST analyzer 110 can, alternatively or in addition, apply other analysis techniques.

The classifier 120 receives a set of AST structures and related features from the AST analyzer 110 and generates an associated probability of maliciousness (also referred to herein as "maliciousness") based at least in part on the gCNN model. The classifier may determine that the object is malicious, benign, or suspicious (i.e., a classification 121). As used herein, the classification "suspicious" refers to a non-definitive determination of maliciousness. Further analysis of suspicious classifications to determine a maliciousness classification, including the generation and analysis of ASTs, can be performed, for example as described in U.S. Pat. No. 9,825,976, the entire contents of which is herein incorporated by reference in its entirety. As shown and discussed herein, in some embodiments, ASTs (generated, for example, as discussed in U.S. Pat. No. 9,825,976) can be provided as inputs to deep neural networks, and the deep neural networks can automatically learn distinguishing or differentiating features of the object(s) under analysis, based on the ASTs. As such, the AST analyzer 110 can include or use (e.g., by communicating with) one or both of: one or more deep neural networks (or deep machine learning (DML) models), and one or more static, hard-coded feature extractors. For example, DML models can preclude the need for hand engineered static features, as they can learn discriminative features from raw input forms. In addition, gCNN models can accept side node descriptive features to enrich the DML model. Although the AST analyzer 110 is shown in FIG. 1 as extracting features and/or structures of the AST and sending them over a network to the classifier 120 for classification 121 of the AST based on the extracted features, the AST analyzer 110 and the classifier 120 may be co-located.

The knowledge store 106 may be co-located with one or more other components of system 100 or located remotely from and connected via one or more networks to some or all other components of system 100. The knowledge store 106 may store (1) feature extractors associated with a gCNN model and (2) the gCNN model.

When a malicious classification is made by the system 100, an alert 123A may be generated by the reporting logic 122. The alert 123A may be provided/sent, for example, to a security administrator and/or to a user of an affected computing device (e.g., the computing device on which the malicious object was detected). A malicious classification alert 123A may initiate/trigger a mitigative action 123B to be taken by the system. In some embodiments, the mitigative action is implemented by an agent executed on an endpoint compute device or a host compute device. In embodiments where the classification is made remotely from the affected compute device, a classification alert 123A generated by the system 100 may trigger a mitigative action 123B to be taken by an agent compute device. The mitigative action 123B can include, for example, the termination of a process affected by the malicious object, the prevention/blocking of further execution of the malicious object, the quarantining of an affected device from a protected network, etc. In some implementations, the system 100 is capable of classifying malicious JavaScript objects (target objects) based on novel associations within the AST of the target object using a gCNN machine learning method that identifies such associations based on the structure of source code itself (i.e., the ASTs).

Figure 2:
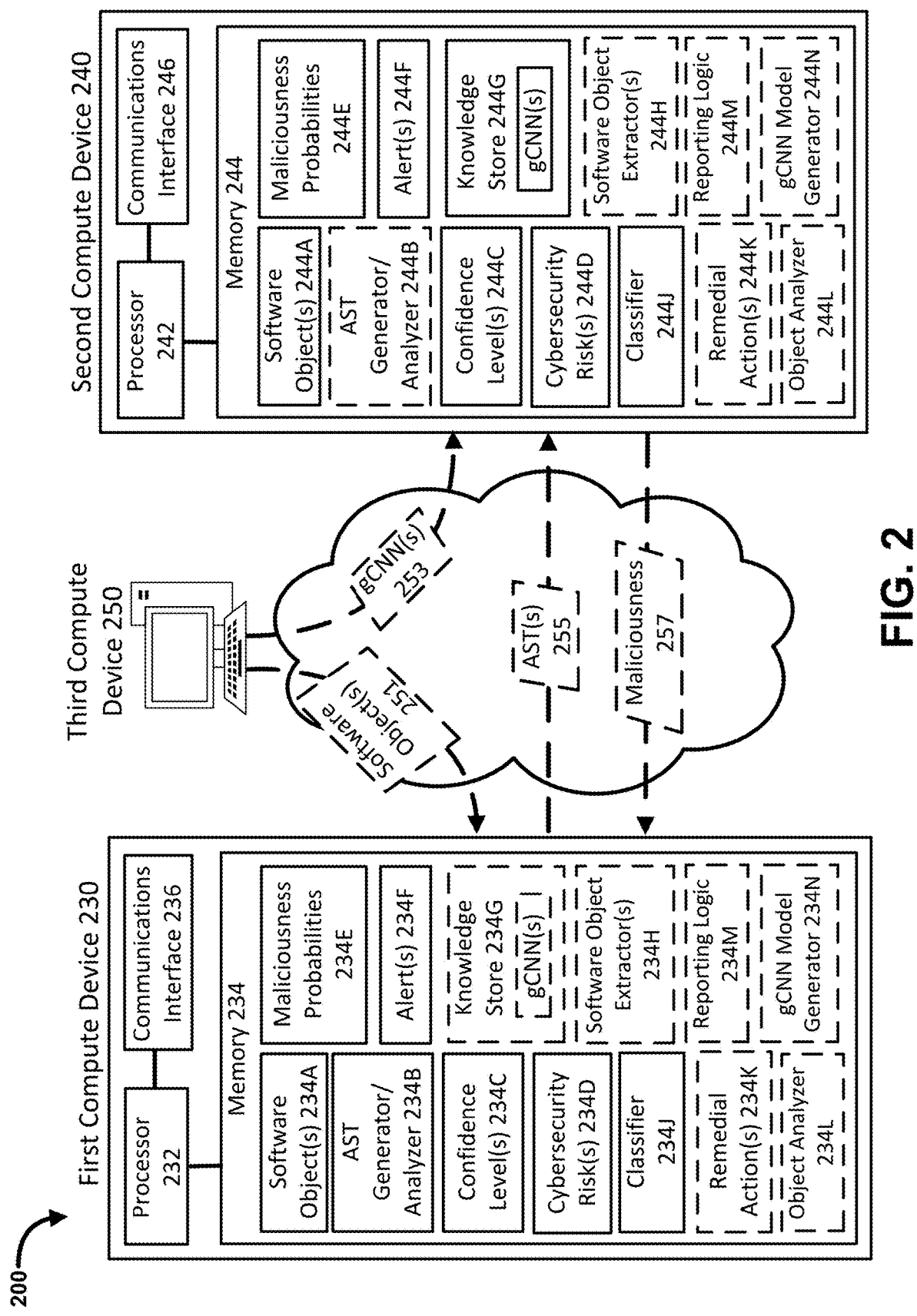
FIG. 2 is a diagram showing a second example system configuration for assessing a cybersecurity risk of a software object, according to an embodiment.

FIG. 2 is a diagram showing a second example system configuration for assessing a cybersecurity risk of a software object, according to an embodiment. In particular, the system 200 of FIG. 2 shows a configuration in which the AST generation and the classification functionalities are in separate locations (e.g., referred to a "cloud-based" classification). The system 200 includes a first compute device 230 and a second compute device 240. The first compute device 230 includes a processor 232, a communications interface 236 (e.g., for wired and/or wireless communication, for example via a communications network) and a memory 234 operably coupled to the processor 232. The memory 234 stores software object(s) 234A, an AST generator/analyzer 234B, confidence level(s) 234C, cybersecurity risk(s) 234D, maliciousness probabilities 234E, alert(s) 234F, and a classifier 234J. The memory 234 also optionally stores a knowledge store 234G including one or more gCNN(s) (and, optionally, feature extractors, not shown), software object extractor(s) 234H, remedial action(s) 234K, an object analyzer 234L, reporting logic 234M, and/or a gCNN model generator 234N. The software object(s) 234A can include one or more software objects 251 that are received, via communications interface 236, from a third compute device 250. The memory 234 stores processor-executable instructions to generate an AST (i.e., AST generator 234B) for a software object 234A (e.g., an interpreted language script), and to determine that the AST is insufficient to identify, to a specified confidence level 234C, a cybersecurity risk or maliciousness probability 234E of the software object 234A. The memory 234 also stores processor-executable instructions to send a first signal 255, including a representation of the AST, to the second compute device 240 in response to determining that the AST is insufficient to identify the cybersecurity risk of the software object. The second compute device 240 can receive the first signal 255, including the representation of the AST, via the communications interface 246 and optionally store the received AST(s) 255 in the memory 244. The memory 234 also stores processor-executable instructions to receive, via communications interface 236, a signal 257 representing a probability of maliciousness of the software object 234A. The memory of the first compute device optionally also stores processor-executable instructions to extract the software object (e.g., via software object extractor(s) 234H) from one of a webpage, an email, or one or more network packets, prior to generating the AST. Alternatively or in addition, the memory of the first compute device 230 can store processor-executable instructions to receive a signal representing an alert (not shown in FIG. 2) associated with the software object from the second compute device, and to perform a remediation action 234K in response to receiving the signal representing the alert.

The second compute device 240 includes a processor 242, a communications interface 246, and a memory 244 operably coupled to the processor 242. The memory 244 stores software object(s) 244A, confidence level(s) 244C, cybersecurity risk(s) 244D, maliciousness probabilities 244E, alert(s) 244F, a knowledge store 244G including one or more gCNN(s) (and, optionally, feature extractors, not shown), and a classifier 234J. The memory 244 also optionally stores software object extractor(s) 244H, remedial action(s) 244K, an object analyzer 244L, reporting logic 244M, a gCNN model generator 244N, and/or an AST generator/analyzer 234B. The memory 244 stores processor-executable instructions to receive the first signal 255 from the first compute device 230, and to generate a set of features for the AST in response to receiving the first signal 255 and based on the AST and a gCNN from the knowledge store 244G, and to generate a probability of maliciousness 244E of the software object 234A based on the set of features and the gCNN. The memory 244 also stores processor-executable instructions to send the signal 257 representing the probability of maliciousness of the software object to the first compute device 230. The memory 244 optionally also stores processor-executable instructions to send a signal representing an alert (not shown in FIG. 2) to the first compute device 230 in response to the generated probability of maliciousness of the software object exceeding a specified value (e.g., having a confidence level 244C above a predetermined threshold, for example, greater than 75%). The memory 244 optionally also stores processor-executable instructions to select the gCNN from a plurality of gCNNs based on the AST prior to generating the set of features for the AST. The memory 244 optionally also stores processor-executable instructions to train the gCNN prior to generating the set of features for the AST. The training of the gCNN can, for example, be accomplished using a corpus of training data generated and/or retrieved from multiple sources, and, optionally, can include the generation and/or retrieval (e.g., from a data warehouse, virus warehouse sites, etc.) of labels for data samples. The labels can be generated (e.g., calculated), for example, based on one or more of: human analysis, user inputs, or heuristics. In some embodiments, the memory 234 and/or the memory 244 also stores processor-executable instructions to retrieve the gCNN(s) (e.g., received, via communications interface 246, at 253) from the third compute device 250.

Figure 3:
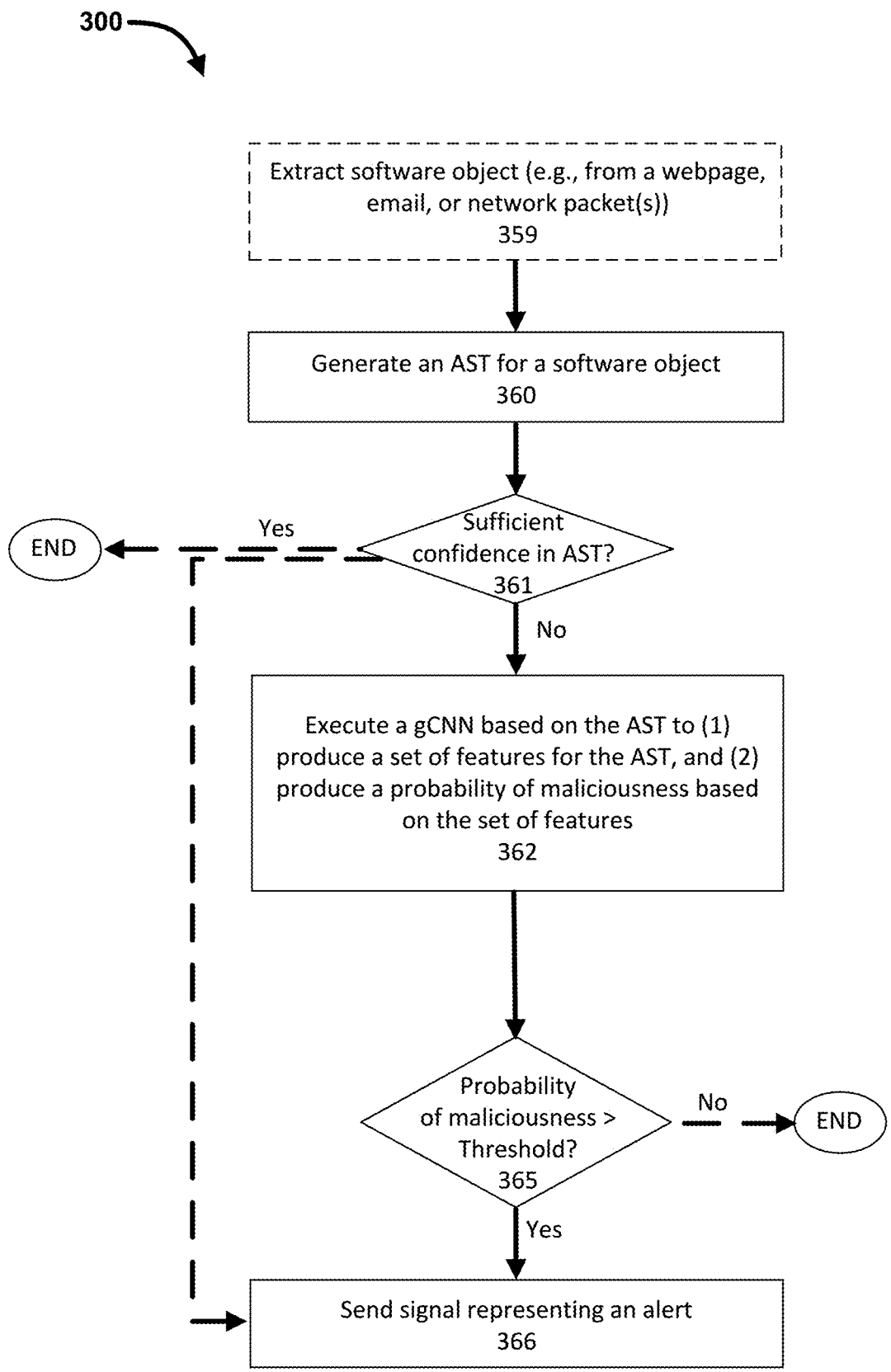
FIG. 3 is a diagram showing a first example method for assessing a cybersecurity risk of a software object, according to an embodiment.

FIG. 3 is a diagram showing a first example method for assessing a cybersecurity risk of a software object, according to an embodiment. As shown in FIG. 3, the method 300 includes generating an AST at 360 for a software object (e.g., an interpreted language script), optionally assigning a confidence score to the AST. In some embodiments, the AST generation 360 is performed at an endpoint compute device, and the software object is received at the endpoint compute device via an internet browser or an external storage medium (e.g., a universal serial bus (USB) drive). In some embodiments (not shown), after the AST is generated at 360 for the software object, variables and/or features may be added to one or more of the AST nodes, to produce an additional layer for subsequent use as part of the gCNN analysis.

The method 300 also includes determining, at 361, whether the AST is sufficient to identify, to a specified confidence level, a cybersecurity risk of the software object. If, at 361, the AST is determined to be sufficient to identify, to the specified confidence level, a cybersecurity risk of the software object, the process optionally terminates and/or a signal representing an alert can be sent, at 366 (e.g., to a remote compute device and/or to a relevant user, such as a system administrator). Without wishing to be bound by theory, it is believed that AST representation of a software object can be an effective tool for classification because it represents how expressions and code concepts within the software object are related to each other, using a hierarchical pattern. If, at 361, the AST is determined to be insufficient to identify, to the specified confidence level, a cybersecurity risk of the software object, a gCNN is selected, e.g., based on the generated AST (e.g., a most appropriate trained gCNN for the generated AST may be identified), and executed at 362 to (1) produce a set of features for the AST, and (2) produce a probability of maliciousness of the software object based on the set of features (e.g., based on a weighting of, and/or computation based on, the features from the set of features). At 365, the probability of maliciousness is compared to a pre-defined or predetermined threshold. If, at 365, the probability of maliciousness is found not to exceed the pre-defined threshold, the process optionally terminates. Alternatively, if at 365, the probability of maliciousness is found to exceed the pre-defined threshold, a signal representing an alert is sent, at 366 (e.g., to a remote compute device and/or to a relevant user, such as a system administrator). Alternatively or in addition, the AST can be labelled with a cybersecurity classification label, and an association between the AST and the assigned label can be stored in a memory (e.g., at the endpoint and/or at a remote compute device).

The method 300 also optionally includes extracting the software object from one of a webpage, an email, or one or more network packets (e.g., of network traffic), at 359, and prior to generating the AST. In such a case, the executing of the gCNN model to produce a probability of maliciousness of the software object at 362 can be further based on at least one of: a source of the network traffic, a destination of the network traffic, or an action taken by the network traffic. Alternatively or in addition, the method can also include receiving the gCNN (e.g., already trained, from a remote compute device) or training the gCNN prior to executing the gCNN based on the AST (not shown). In some such embodiments, a run-time behavior of the software object is detected, and the gCNN is trained (and/or retrained) based on the detected run-time behavior of the software object. For example, runtime data can be collected at one or multiple endpoints and sent to one or more servers performing the method 300, The one or more servers could then train the gCNN based on the runtime data and the ASTExamples of run-time behavior can include, but are not limited to: call delegations, execution times, compute device resource usage, etc. The signal representing the alert can include a trigger to initiate a mitigative action at a compute device associated with the software object.

Figure 4:
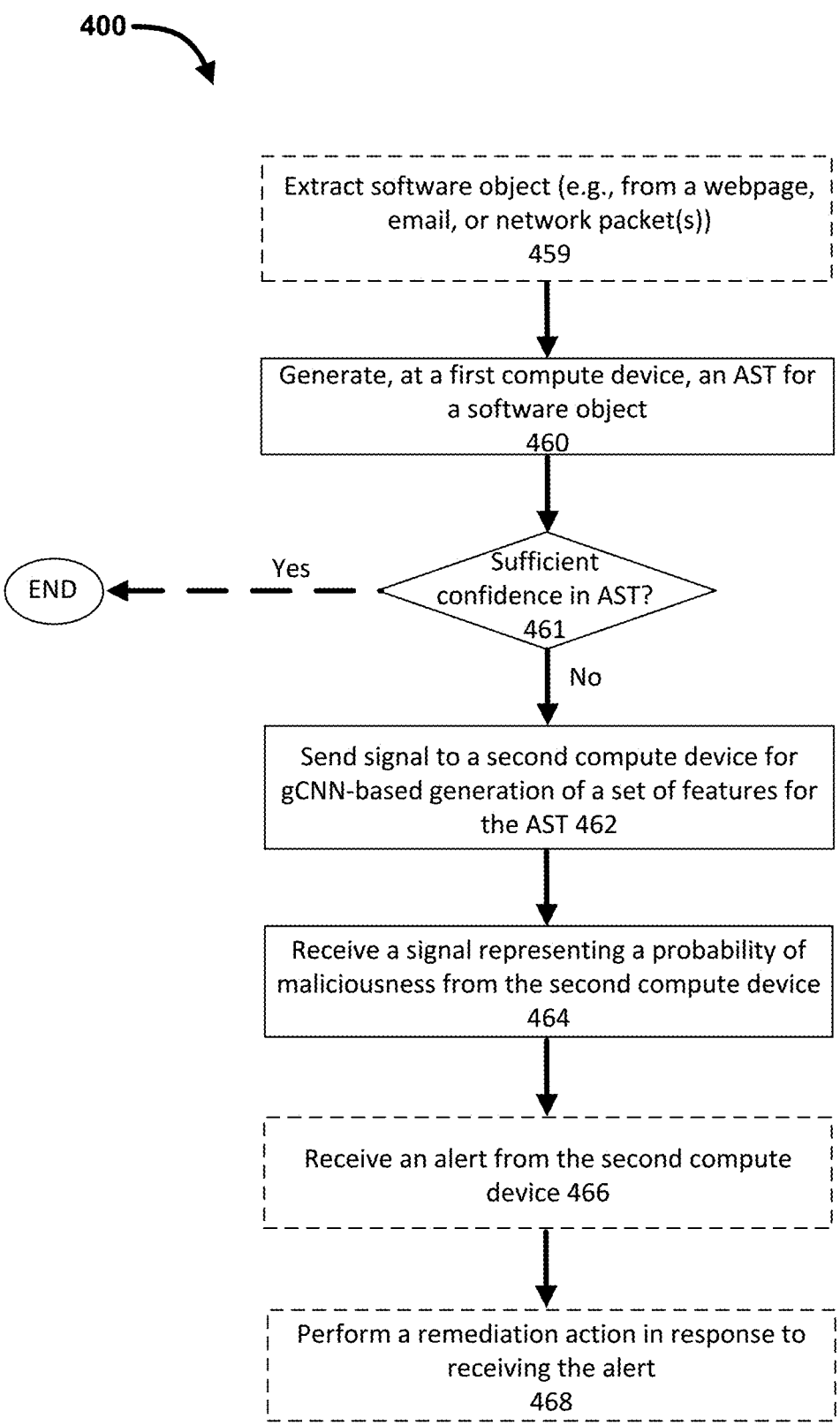
FIG. 4 is a diagram showing a second example method for assessing a cybersecurity risk of a software object, according to an embodiment.

FIG. 4 is a diagram showing a second example method for assessing a cybersecurity risk of a software object, according to an embodiment. As shown in FIG. 4, the method 400 (which can be performed, for example, using the system 200 of FIG. 2) includes generating an AST, at 460, at a first compute device and for a software object (e.g., received at the first compute device and/or extracted at 459 from one of a webpage, an email, or one or more network packets). At 461, a determination is made as to whether the AST is sufficient to identify, to a specified confidence level, a cybersecurity risk of the software object. If, at 461, the AST is determined to be sufficient to identify, to the specified confidence level, a cybersecurity risk of the software object, the process optionally terminates. Alternatively, if at 461 the AST is determined to be insufficient to identify, to the specified confidence level, a cybersecurity risk of the software object, a signal is sent (at 462) to a second compute device, in response to the determination, for gCNN-based generation of a set of features for the AST. The method 400 also includes receiving, at 464 and from the second compute device, a signal representing a probability of maliciousness of the software object that was calculated by the gCNN and based on the set of features for the AST. The method 400 optionally also includes receiving, at 466 from the second compute device, a signal representing an alert based on the generated probability of maliciousness if the generated probability of maliciousness exceeds a specified value. Alternatively or in addition, the method 400 also includes receiving, from the second compute device, a signal representing an alert based on the generated probability of maliciousness if the generated probability of maliciousness exceeds a specified value, and performing a remediation action at 468 in response to receiving the signal representing the alert. Examples of remediation actions include, but are not limited to: blocking the transmission of one or more network data packets, sending a signal representing an alert to one or more compute devices, etc. The software object can be or include an interpreted language script. The method optionally also includes receiving the gCNN (e.g., in an already-trained state, from a remote compute device) or training the gCNN, prior to the gCNN-based generation of the set of features for the AST.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

It is intended that the systems and methods described herein can be performed by software (stored in memory and/or executed on hardware), hardware, or a combination thereof. Hardware modules may include, for example, a general-purpose processor, a field programmable gates array (FPGA), and/or an application specific integrated circuit (ASIC). Software modules (executed on hardware) can be expressed in a variety of software languages (e.g., computer code), including Unix utilities, C, C++, Java™, JavaScript, Ruby, SQL, SAS®, Python, Fortran, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, and solid state storage devices; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Processor-executable instructions can be in many forms, such as program modules, executed by one or more compute devices, and can include routines, programs, objects, components, data structures, and other suitable code that causes a processor to perform particular tasks or implement particular data types, and the functionality can be combined and/or distributed as appropriate for various embodiments.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

The invention claimed is:

1. A method for assessing a cybersecurity risk of a software object, the method comprising:
   generating, for the software object, an abstract syntax tree (AST);
   determining that the AST is insufficient to identify, to a specified confidence level, a cybersecurity risk of the software object;
   identifying a graph convolutional neural network (gCNN) from a set of gCNNs based on the AST;
   executing, in response to determining that the AST is insufficient to identify the cybersecurity risk of the software object, the gCNN based on the AST, to (1) produce a set of features for the AST, and (2) produce a probability of maliciousness of the software object, based on the set of features;
   sending a signal representing an alert based on the probability of maliciousness if the probability of maliciousness exceeds a pre-defined threshold.

2. The method of claim 1, wherein the software object is an interpreted language script.

3. The method of claim 1, further comprising extracting the software object from one of a webpage, an email, or one or more network packets, prior to generating the AST.

4. The method of claim 1, wherein the signal representing the alert includes a trigger to initiate a mitigative action at a compute device associated with the software object.

5. The method of claim 1, further comprising extracting the software object from network traffic prior to generating the AST, the executing the gCNN to produce the probability of maliciousness of the software object being further based on at least one of: a source of the network traffic, a destination of the network traffic, or an action taken by the network traffic.

6. The method of claim 1, further comprising one of receiving the gCNN or training the gCNN, prior to executing the gCNN based on the AST.

7. The method of claim 6, further comprising:
   detecting a run-time behavior of the software object,
   wherein the training the gCNN is based on the detected run-time behavior of the software object.

8. A method for assessing a cybersecurity risk of a software object, the method comprising:
   generating, at a first compute device and for a software object, an abstract syntax tree (AST);
   determining that the AST is insufficient to identify, to a specified confidence level, a cybersecurity risk of the software object;
   determining that the cybersecurity risk of the software object cannot be determined based on previous cybersecurity risk classifications of other software objects;
   sending a signal to a second compute device, in response to determining that the AST is insufficient to identify the cybersecurity risk of the software object and determining that the cybersecurity risk of the software object cannot be determined based on the previous cybersecurity risk classifications, for gCNN-based generation of a set of features for the AST; and
   receiving, from the second compute device, a signal representing a probability of maliciousness of the software object that was calculated by the gCNN and based on the set of features for the AST.

9. The method of claim 8, further comprising receiving, from the second compute device, a signal representing an alert based on the generated probability of maliciousness if the generated probability of maliciousness exceeds a specified value.

10. The method of claim 8, further comprising:
    receiving, from the second compute device, a signal representing an alert based on the generated probability of maliciousness if the generated probability of maliciousness exceeds a specified value; and
    performing a remediation action in response to receiving the signal representing the alert.

11. The method of claim 8, further comprising receiving the software object at the first compute device prior to generating the AST.

12. The method of claim 8, further comprising extracting the software object from one of a webpage, an email, or one or more network packets, prior to generating the AST.

13. The method of claim 8, wherein the software object is an interpreted language script.

14. The method of claim 8, further comprising one of receiving the gCNN or training the gCNN, prior to the gCNN-based generation of the set of features for the AST.

15. A system for assessing a cybersecurity risk of a software object, the system comprising:
    a first compute device including a processor and a memory operably coupled to the processor of the first compute device, the memory of the first compute device storing processor-executable instructions to:
    generate an abstract syntax tree (AST) for a software object,
    determine that the AST is insufficient to identify, to a specified confidence level, a cybersecurity risk of the software object,
    determine that the cybersecurity risk of the software object cannot be determined based on previous cybersecurity risk classifications of other objects,
    send a first signal including a representation of the AST, in response to determining that the AST is insufficient to identify the cybersecurity risk of the software object and determining that the cybersecurity risk of the software object cannot be determined based on the previous cybersecurity risk classifications, and
    receive a signal representing a probability of maliciousness of the software object; and
    a second compute device including a processor and a memory operably coupled to the processor of the second compute device, the memory of the second compute device storing processor-executable instructions to:
    receive the first signal;
    generate, in response to receiving the first signal and based on the AST and a graph convolutional neural network (gCNN), a set of features for the AST;
    generate, based on the set of features and the gCNN, a probability of maliciousness of the software object; and
    send the signal representing the probability of maliciousness of the software object to the first compute device.

16. The system of claim 15, wherein the memory of the second compute device further stores processor-executable instructions to send a signal representing an alert to the first compute device in response to the generated probability of maliciousness of the software object exceeding a specified value.

17. The system of claim 15, wherein the software object is an interpreted language script.

18. The system of claim 15, wherein the memory of the first compute device further stores processor-executable instructions to extract the software object from one of a webpage, an email, or one or more network packets, prior to generating the AST.

19. The system of claim 15, wherein the memory of the first compute device further stores processor-executable instructions to:
receive, from the second compute device, a signal representing an alert associated with the software object; and
performing a remediation action in response to receiving the signal representing the alert.

20. The system of claim 15, wherein the gCNN is stored within the memory of the second compute device.

21. The system of claim 15, wherein the second compute device is a first remote compute device, the memory of the first remote compute device further storing processor-executable instructions to retrieve the gCNN from a second remote compute device.

22. The system of claim 15, wherein the memory of the second compute device further stores processor-executable instructions to select the gCNN from a plurality of gCNN based on the AST prior to generating the set of features for the AST.

23. The system of claim 15, wherein the memory of the second compute device further stores processor-executable instructions to train the gCNN prior to generating the set of features for the AST.

* * * * *